United States Patent [19]

Clubbs et al.

[11] Patent Number: 5,143,665
[45] Date of Patent: Sep. 1, 1992

[54] METHOD OF PRODUCING MOLDS THAT CAN BE WASHED AWAY WITH WATER AND USE OF SUCH MOLDS

[75] Inventors: Neville H. Clubbs; Hans-Joachim Förster, both of Schwetzingen; Ulrich Kiefer, Eppelheim; Jürgen Bleh, Mutterstadt, all of Fed. Rep. of Germany

[73] Assignee: Giulini Chemie GmbH, Ludwigshafen/Rh, Fed. Rep. of Germany

[21] Appl. No.: 676,275

[22] Filed: Mar. 28, 1991

Related U.S. Application Data

[62] Division of Ser. No. 344,979, Apr. 28, 1989, abandoned.

[30] Foreign Application Priority Data

Apr. 29, 1988 [DE] Fed. Rep. of Germany ....... 3814528

[51] Int. Cl.$^5$ .............................................. B29C 33/52
[52] U.S. Cl. .................................. 264/221; 106/38.3; 164/132; 164/522; 264/317; 264/257
[58] Field of Search ............... 264/219, 221, 225, 317, 264/DIG. 44, 257, 258; 106/38.3; 164/132, 522; 249/61, 63

[56] References Cited

U.S. PATENT DOCUMENTS

| | | | |
|---|---|---|---|
| 2,389,539 | 11/1945 | Pavlish et al. | 106/38.3 |
| 2,389,542 | 11/1945 | Pavlish et al. | 106/38.3 |
| 2,754,220 | 7/1956 | Gardner | 106/38.3 |
| 3,007,803 | 11/1961 | Clark et al. | 106/38.3 |
| 4,148,660 | 4/1979 | Lankard et al. | 106/38.3 |
| 4,749,431 | 6/1988 | Fässle et al. | 264/225 |
| 4,834,929 | 5/1989 | Dohoff et al. | 264/226 |
| 4,990,292 | 2/1991 | Hattori et al. | 264/226 |

FOREIGN PATENT DOCUMENTS

| | | | |
|---|---|---|---|
| 2401888 | 3/1979 | France . | |
| 2565262 | 9/1986 | France . | |
| 45-6001 | 2/1970 | Japan | 106/38.3 |

*Primary Examiner*—Jay H. Woo
*Assistant Examiner*—Robert B. Davis
*Attorney, Agent, or Firm*—Spencer, Frank & Schneider

[57] ABSTRACT

Method of producing a mold from a ceramic composition which can be washed-out with water after use thereof in a molding process, the method including forming a ceramic composition by mixing from about 30 to about 80 weight percent of at least one hemihydrate including alpha-calcium sulfate hemihydrate or beta-calcium sulfate hemihydrate, from about 5 to about 45 weight percent of fire clay, and from about 5 to about 25 weight percent of at least one silicate-based filler. About 100 parts by weight of the ceramic composition are mixed under stirring into from about 46 to about 54 parts by weight of water to form a slurry. The slurry is poured into a formation mold suitable for forming the desired mold and the slurry contained in the formation mold is allowed to set and form a set body. The set body is then removed from the formation mold and dried to provide the mold. The mold can be used to provide molded articles of composite materials, low melting point alloys or plastics, so long as these materials can be heated to at least 125° C. and preferably to at least 150° C. it is the heating of the mold to a temperature of at least 125° C. which renders the mold able to be washed-out of an article molded therewith using water. Heating may take place before, during or after the production of the molded article.

20 Claims, No Drawings

METHOD OF PRODUCING MOLDS THAT CAN BE WASHED AWAY WITH WATER AND USE OF SUCH MOLDS

CROSS-REFERENCE TO RELATED APPLICATION

This is a division of application Ser. No. 07/344,979, filed Apr. 28, 1989, now abandoned.

BACKGROUND OF THE INVENTION

1. Field of the Invention

The present invention relates to compositions based on calcium sulfate hemihydrate and, in particular, to such compositions for the production of cores and molds that can be subsequently washed-out with water, to a method of producing such cores and molds, and to the use of such cores and molds for the production of molded articles and molded structural components (hereinafter referred to as "molded articles" but intended to encompass molded articles and molded structural components) made of, for example, composite substances, plastics including thermoplastics, duroplastics, and elastomers, or low melting point metal alloys.

2. Description of the Related Art

Compositions for the production of molds that can be washed-out, especially cores, have been known for a long time. For example, eutectic mixtures are available whose melting temperature lies below 300° C. and, in particular, below 150° C.. These eutectic mixtures are melted in complicated melting vessels equipped with stirring mechanisms and are thereafter cast in molds for the production of cores, winding mandrels and the like. Since, moreover, these eutectic mixtures are sensitive to humidity, it is necessary to take protective measures, such as employing dehumidifiers, in addition to employing expensive melting devices and complicated mixing apparatus.

Low melting point metal alloys are also available for the production of lost cores or molds. These alloys can be, for example, melted out by the application of heat and are thus also suitable for those molds and cores that are required for the production of complicated structural components, e.g., those having internally undercut construction, and molded articles. However, this process also requires expensive melting and casting equipment, as well as temperature resistant molds.

Finally there is the wax melting process which is also unsuitable for many purposes as is well known.

Although natural gypsum is also used for the production of cores and molds, it requires a hammer and chisel to remove such cores and molds from the component since natural gypsum cannot be washed-out with either cold or hot water.

SUMMARY OF THE INVENTION

Thus, it is an object of the present invention to provide a ceramic composition which is suitable for the production of cores and molds which can be washed-out with water.

It is another object of the present invention to provide a method of producing a core or a mold, which can be washed out with water and can be produced without expensive melting devices, complicated mixing apparatus and casting equipment.

It is yet another object of the present invention to provide a process of producing a molded article which employs a core or a mold, which can be washed-out with water and can be produced without expensive melting devices, complicated mixing apparatus and casting equipment.

Surprisingly it has now been found that this can be accomplished by a ceramic composition comprised of from about 30 to about 80 weight percent of at least one hemihydrate selected from the group consisting of alpha-calcium sulfate hemihydrate and beta-calcium sulfate hemihydrate; from about 5 to about 45 weight percent of fireclay; and from about 5 to about 25 weight percent of at least one silicate-based filler. Preferably, ceramic compositions are employed which are composed of from about 40 to about 50 weight percent of the at least one hemihydrate; from about 35 to about 40 weight percent of the fireclay; and from about 15 to about 20 weight percent of the at least one silicon-based filler.

Fireclay is an acidic refractory earth comprised of aluminum silicates.

Particularly suitable silicate-bas d fillers include talcum, bentonite and/or kaolin. Other silicates can also be employed, however, it is preferred that the fillers swell while absorbing water and thus cause the molds and cores to quickly decompose during the washing-out process.

To produce molds and cores that can be washed-out with water (hereinafter referred to as "molds" but intended to encompass "molds and cores"), about 100 parts by weight of a ceramic composition in powdered form are stirred into from about 46 to about 54 parts by weight water, preferably from about 47 to about 50 parts by weight water to form a slurry. The resulting slurry is then processed in a known manner into molds, i.e.; such as by pouring the slurry into a formation mold, which, after setting to form a molded body, are unmolded, i.e., removed from the formation mold, and dried to form the desired molds. After producing the molded article, and before the molds are washed-out, the molded article, together with the mold, is heated for at least two hours to at least 125° C. and, preferably, to at least 150° C. Heating the mold to at least 125° or 150° C., respectively, is an absolutely necessary process feature of the present invention. If heating is omitted, molds are obtained which cannot be washed-out with either cold or hot water.

At this point, it should be mentioned that the point in time during the process sequence at which the assembly is heated to at least 125° C. and, preferably, to at least 150° C., is not critical in the novel process. Heating can take place before or after use of the molds for the production of molded articles and molded structural components, comprised of, for example, a composite material, such as compound fiber materials, according to well-known methods, including the prepreg method, wet-laminate method, and winding method. The molded articles may be comprised of a plastic material and may be produced by a casting method or an injection molding method, or may be comprised of a low melting point metal alloy and may be produced by a casting method. Even if the molds according to the invention are used for the production of molded articles comprised of plastics, such as thermoplastics, duroplastics, or elastomers, or low melting point metal alloys, heating of the mold may take place before, during or after the production of the molded article, as long as the composite materials, plastics, and metal alloys are heat resistant at a temperature range of around at least 125° C. and, preferably, at least 150° C.

Particularly suitable grain size distributions for the calcium sulfate hemihydrate and silicate-based filler components are average grain sizes ranging from 10 to 50 μm, particularly average grain sizes ranging from 15 to 25 μm. The average grain sizes may also lie outside these ranges, however. The suitable grain size distribution for the fireclay component ranges from greater than zero up to 500 μm, such as from 0.0001 to 500μm.

DESCRIPTION OF THE PREFERRED EMBODIMENTS

The subject matter of the invention will now be described in greater detail with the aid of the following examples.

COMPARATIVE EXAMPLE 1

A mixture was prepared by mixing in a tumbling mixer 500 g of alpha-calcium sulfate hemihydrate having an average grain size of about 15 μm, 350 g of fireclay having a grain size ranging from greater than zero up to 500 μm, and 150 g of talcum having an average grain size of about 20 μm. The mixture was then intensively mixed with 500 ml water and the resulting slurry was poured into a vessel. The thickness of the layer in the vessel was about 1 cm.

One hour after pouring, the resulting body was removed from the mold and dried for 12 hours at 45° C. After drying, the body was weighed and then immersed in water for 24 hours, whereupon it was again dried for 12 hours at 45° C. and weighed once more. It was found that the body lost only 1% of its weight after the 24 hours of immersion.

EXAMPLE 2

The body formed according to Example 1 was heated at 150° C. for two hours and, after cooling to room temperature, was again immersed in water. Immediately after submersion, the body was observed to swell and form gas bubbles. After two hours, the original outer contour of the body was hardly discernable. After 12 hours, the body had completely fallen apart.

EXAMPLE 3

500 g of beta-calcium sulfate hemihydrate having an average grain size of about 25 μm, 350 g of fireclay having a grain size ranging from greater than zero up to 500 μm, and 150 g of talcum having an average grain size of about 20 μm were mixed for 10 minutes in a tumbling mixer to provide a homogeneous mixture. The mixture was processed further as in Examples 1 and 2. When tested in water, the resulting bodies showed practically the same results as before.

EXAMPLE 4

450 g of alpha-calcium sulfate hemihydrate having an average grain size of about 18 μm were mixed for 10 minutes in a tumbling mixer with 400 g of fireclay having a grain size ranging from greater than zero up to 500 μm and 150 g of kaolin having an average grain size of about 25 μm. The mixture was then intensively mixed with 450 g water and the resulting slurry was poured into a vessel. The thickness of the layer in the vessel was 1 cm.

After a setting time of one hour, the resulting body was removed from the mold and dried for 24 hours at 40° C. Thereafter, the molded body was heated for two hours at 140° C. and, after cooling to room temperature, was immersed in water. Immediately after immersion, the molded body swelled and formed gas bubbles. After about 2 hours, the original outer contour of the body was practically no longer discernible. After 12 hours the body had fallen apart completely.

EXAMPLE 5

A molded body was produced as in Example 4. Instead of kaolin, however, calcium bentonite was employed. Here again swelling with gas bubble formation was observed after immersion. After 11 hours, the body had fallen apart completely.

It will be understood that the above description of the present invention is susceptible to various modifications, changes and adaptations, and the same are intended to be comprehended within the meaning and range of equivalents of the appended claims.

What is claimed is:

1. A method of producing a mold which can be washed away with water after use thereof in a molding process provided that the mold is heated for at least 2 hours at a temperature of at least 125° C. prior to being removed by washing away with water, the method comprising:
   a. providing a ceramic composition by dry mixing:
      (i) from about 30 to about 80 weight percent of at least one hemihydrate selected from the group consisting of alpha-calcium sulfate hemihydrate and beta-calcium sulfate hemihydrate;
      (i.i.) from about 5 to about 45 weight percent of fireclay; and
      (i.i.i.) from about 5 to about 25 weight percent of at least one silicate-based filler;
   b. mixing about 100 parts by weight of the ceramic composition under stirring into from about 46 to about 54 parts by weight of water to form a slurry;
   c. pouring the slurry into a formation mold suitable for forming the mold;
   d. allowing the slurry contained in the formation mold to set and form a set body;
   e. removing the set body from the formation mold; and
   f. drying the set body to provide the mold.

2. The method according to claim 1, wherein the ceramic composition is formed by mixing from about 40 to about 50 weight percent of the at least one hemihydrate; from about 35 to about 40 weight percent of the fire clay; and from about 15 to about 20 weight percent of the at least one silicate-based filler.

3. The method according to claim 2, wherein the at least one silicate-based filler is selected from the group consisting of talcum, bentonite and kaolin.

4. The method according to claim 3, wherein the set body is dried at a temperature of at least 45° C.

5. The method according to claim 1, wherein the at least one silicate-based filler is selected from the group consisting of talcum, bentonite and kaolin.

6. The method according to claim 5, wherein the set body is dried at a temperature of at least 45° C.

7. The method according to claim 1, wherein the set body is dried at a temperature of at least 45° C.

8. The method according to claim 1, further comprising heating the mold after drying in step (f) for at least 2 hours at a temperature of at least 125° C.

9. The method according to claim 8, wherein heating is at a temperature of at least 150° C.

10. The process of producing a molded article comprised of a composite material by a method selected from the group consisting of a prepreg method and a wet laminate method, the process comprising:

employing a mold prepared by a method of producing a mold which can be washed away with water after use thereof in a molding process provided that the mold is heated for at least 2 hours at a temperature of at least 125° C. prior to being removed by washing away with water, the method comprising:
 a. providing a ceramic composition by dry mixing:
  (i) from about 30 to about 80 weight percent of at least one hemihydrate selected from the group consisting of alpha-calcium sulfate hemihydrate and beta-calcium sulfate hemihydrate;
  (i.i.) from about 5 to about 45 weight percent of fireclay; and
  (i.i.i.) from about 5 to about 25 weight percent of at least one silicate-based filler;
 b. mixing about 100 parts by weight of the ceramic composition under stirring into from about 46 to about 54 parts by weight of water to from a slurry;
 c. pouring the slurry into a formation mold suitable for forming the mold;
 d. allowing the slurry contained in the formation mold to set and form a set body;
 e. removing the set body from the formation mold; and
 f. drying the set body to provide the mold, and
removing the mold from said molded article by washing away the mold with water, wherein prior to being removed by washing the mold out of the molded article, the mold is heated for 2 hours at a temperature of at least 125° C.

11. The process according to claim 10, wherein the mold is heated at a temperature of at least 150° C.

12. The process according to claim 10, wherein the at least one silicate-based filler is selected from the group consisting of talcum, bentonite and kaolin.

13. The process of producing a molded article comprised of a low melting point metal alloy by a casting method, comprising:

employing a mold prepared by a method of producing a mold which can be washed away with water after use thereof in a molding process provided that the mold is heated for at least 2 hours at a temperature of at least 125° C. prior to being removed by washing away with water, the method comprising:
 a. providing a ceramic composition by dry mixing:
  (i) from about 30 to about 80 weight percent of at least one hemihydrate selected from the group consisting of alpha-calcium sulfate hemihydrate and beta-calcium sulfate hemihydrate;
  (i.i.) from about 5 to about 45 weight percent of fireclay; and
  (i.i.i.) from about 5 to about 25 weight percent of at least one silicate-based filler;
 b. mixing about 100 parts by weight of the ceramic composition under stirring into from about 46 to about 54 parts by weight of water to form a slurry;
 c. pouring the slurry into a formation mold suitable for forming the mold;
 d. allowing the slurry contained in the formation mold to set and form a set body;
 e. removing the set body from the formation mold; and
 f. drying the set body to provide the mold, and
removing the mold from the molded article by washing away the mold with water,
wherein the mold is heated for 2 hours at a temperature of at least 125° C. prior to being washed out of the molded articles.

14. The process according to claim 13, wherein the at least one silicate-based filler is selected from the group consisting of talcum, bentonite and kaolin.

15. The process according to claim 13, wherein the low melting point metal alloy has a melting temperature below 300° C.

16. The process according to claim 13, wherein the low melting point metal alloy has a melting temperature below 150° C.

17. The process according to claim 13, wherein the mold is heated at a temperature of at least 150° C.

18. The process of producing a molded article comprised of a plastic by a method selected from the group consisting of a casting method and an injection molding method, the process comprising employing a mold prepared by a method of producing a mold which can be washed away with water after use thereof in a molding process provided that the mold is heated for at least 2 hours at a temperature of at least 125° C. prior to being removed by washing away with water, the method comprising:
 a. providing a ceramic composition by dry mixing:
  (i) from about 30 to about 80 weight percent of at least one hemihydrate selected from the group consisting of alpha-calcium sulfate hemihydrate and beta-calcium sulfate hemihydrate;
  (i.i.) from about 5 to about 45 weight percent of fireclay; and
  (i.i.i.) from about 5 to about 25 weight percent of at least one silicate-based filler;
 b. mixing about 100 parts by weight of the ceramic composition under stirring into from about 46 to about 54 parts by weight of water to form a slurry;
 c. pouring the slurry into a formation mold suitable for forming the mold;
 d. allowing the slurry contained in the formation mold to set and form a set body;
 e. removing the set body from the formation mold; and
 f. drying the set body to provide the mold,
removing the mold from the molded article by washing away the mold with water,
wherein the mold is heated for 2 hours at a temperature of at least 125° C. prior to being washed out of the molded articles.

19. The process according to claim 18, wherein the at least one silicate-based filler is selected from the group consisting of talcum, bentonite and kaolin.

20. The process according to claim 18, wherein the mold is heated at a temperature of at least 150° C.

* * * * *